United States Patent
Krajekian

(10) Patent No.: US 8,641,064 B2
(45) Date of Patent: Feb. 4, 2014

(54) TILTING VEHICLE WITH A NON-TILTING AUTOMOBILE-LIKE BODY

(76) Inventor: Garbis Krajekian, Chandler, AZ (US)

( * ) Notice: Subject to any disclaimer, the term of this patent is extended or adjusted under 35 U.S.C. 154(b) by 9 days.

(21) Appl. No.: 13/467,558

(22) Filed: May 9, 2012

(65) Prior Publication Data

US 2013/0168934 A1     Jul. 4, 2013

Related U.S. Application Data

(60) Provisional application No. 61/581,564, filed on Dec. 29, 2011.

(51) Int. Cl.
    *B62D 9/02*         (2006.01)

(52) U.S. Cl.
    USPC ............... 280/124.103; 280/5.509; 180/210

(58) Field of Classification Search
    USPC ............ 280/124.103, 5.509, 5.508; 180/210, 180/908
    See application file for complete search history.

(56) References Cited

U.S. PATENT DOCUMENTS

| | | | |
|---|---|---|---|
| 4,487,429 A | 12/1984 | Ruggles | |
| 6,511,078 B2 | 1/2003 | Sebe | |
| 7,343,997 B1 | 3/2008 | Matthies | |
| 7,377,522 B2 | 5/2008 | MacIsaac | |
| 7,487,985 B1 | 2/2009 | Mighell | |
| 7,568,541 B2 | 8/2009 | Pfeil et al. | |
| 7,591,337 B2 | 9/2009 | Suhre et al. | |
| 7,600,596 B2 | 10/2009 | Van Den Brink et al. | |
| 7,607,695 B2 | 10/2009 | Moulene et al. | |
| 7,631,721 B2 | 12/2009 | Hobbs | |
| 7,647,999 B2 | 1/2010 | Geiser | |
| 7,648,148 B1 | 1/2010 | Mercier | |
| 7,665,749 B2 | 2/2010 | Wilcox | |
| 7,669,864 B2 | 3/2010 | Rawlinson | |
| 7,708,291 B1 | 5/2010 | Henderson | |
| 7,722,063 B2 | 5/2010 | Dieziger | |
| 7,762,368 B2 | 7/2010 | Matthies | |
| 7,850,180 B2 | 12/2010 | Wilcox | |
| 7,878,290 B2 | 2/2011 | Tsujii et al. | |
| 7,934,579 B2* | 5/2011 | Bowers | 180/352 |
| 7,967,306 B2 | 6/2011 | Mighell | |
| 8,123,240 B2* | 2/2012 | Mercier | 280/124.103 |
| 2008/0012262 A1 | 1/2008 | Carabelli et al. | |
| 2009/0312908 A1 | 12/2009 | Van Den Brink | |
| 2010/0032914 A1 | 2/2010 | Hara et al. | |
| 2010/0072721 A1* | 3/2010 | Plumley | 280/124.103 |
| 2010/0168966 A1 | 7/2010 | Tsujii et al. | |
| 2011/0006498 A1 | 1/2011 | Mercier | |
| 2011/0148052 A1 | 6/2011 | Quemere et al. | |

\* cited by examiner

*Primary Examiner* — John Walters
*Assistant Examiner* — Brian Swenson
(74) *Attorney, Agent, or Firm* — Morgan Law Offices, PLC

(57) ABSTRACT

A tilting multi-wheeled vehicle includes a tilting frame supporting at least one seat; a body; and a suspension assembly, wherein the suspension assembly is structured and arranged to permit a transversely disposed pair of the wheels to tilt with the tilting frame. While the tilting frame tilts, the body remains in a controlled relationship with the tilting frame. In an embodiment, the controlled relationship with the tilting frame permits the body to remain substantially parallel to the road surface. Accordingly, the vehicle can support a wider automobile-like body which will not contact the road surface when the tilting frame tilts while navigating a turn. In another embodiment, the body can be allowed to remain substantially parallel to and equidistant from the road surface while navigating a turn.

20 Claims, 18 Drawing Sheets

DETAIL A

TILTING VEHICLE WITH A NON-TILTING AUTOMOBILE-LIKE BODY

CROSS REFERENCE TO RELATED APPLICATIONS

The present application is related to and claims priority from prior provisional application Ser. No. 61/581,564 filed by Garbis Krajekian on Dec. 29, 2011 and entitled "Tilting Vehicle with a Non-tilting Automobile-Like Body", the contents of which are incorporated herein by reference.

FIELD OF THE INVENTION

The present invention relates to the field of tilting multi-wheeled vehicles, and more particularly, to tilting multi-wheeled motorized vehicles.

BACKGROUND

Tilting multi-wheeled vehicles, in particular, tilting three wheeled vehicles with two front wheels are operated like motorcycles where such vehicles lean into a turn. Unlike motorcycles, an added extra wheel in front provides additional traction for improved stopping and control of the vehicle on slippery surfaces. This type of vehicle is usually lighter, and can be made narrower than a non-titling three or four wheeled vehicle.

In the prior art, titling three wheelers have generally been of the straddle type, or having a recumbent seat, where the operator rides the vehicle like a motorcycle and controls the lean by shifting his/her body weight and by practicing counter-steer techniques.

Some patents advocate the utilization of tilt lock or tilt limiting mechanisms and footboards on a non-tilting portion (simulating the ground) where the operator can use these boards to control the lean of the vehicle for added safety and stability. Examples of this type are described in U.S. Pat. No. 4,088,199 to Trautwein and U.S. Pat. No. 7,530,419 to Brudeli.

It has also been known to implement tilt control mechanisms, usually hydraulic, pneumatic, or electro-mechanical actuators, connected between a tilting and non-tilting portion of a tilting vehicle. This type of arrangement simplifies the operation of the vehicle where the rider doesn't need to learn how to operate a free leaning vehicle (motorcycle), and can practice simple steer. Such mechanisms are manually activated by the operator or use some type of pendulum device or an electronic control unit that uses the input from different sensors (such as speed, steering angle, lateral forces, etc.) to control the tilt mechanism without user input. While such arrangements provide acceptable tilt control mechanisms, they do not replicate the exact feeling generated by a free leaning motorcycle or tilting three wheeled vehicle. An example of this type of tilt control is described in U.S. Published Patent Application No. 2009/0312908 to Van Den Brink.

Some have described tilting vehicles having an enclosed or partially enclosed cabin mounted on a titling portion of the frame, having enough space for one or two inline (back to back) seats, and just enough width to accommodate one rider. While this type of enclosure provides better protection to the rider than an open tilting vehicle, it usually is relatively narrow since a wide body would touch the ground even at moderate lean angles. This makes it necessary to design the body with a narrow or rounded bottom thus creating a displeasing aesthetic appearance. Further, a narrow titling vehicle is not as safe as a vehicle that can support a wider frame and enclosure (creating a greater buffer zone between the rider and the frame), at least when it comes to side impact in the case of a collision with another vehicle or in the case of a rollover. An extremely narrow enclosure also limits the ornamental design that can be applied to the completely or partially enclosed tilting vehicle, thus reducing the chance of success in the marketplace.

SUMMARY

The disclosure relates to a vehicle having at least three wheels. The vehicle includes a tilting frame supporting at least one seat; a body; and a suspension assembly, wherein the suspension assembly is structured and arranged to permit a transversely disposed pair of the wheels to tilt with the tilting frame. While the tilting frame tilts, the body remains in a controlled relationship with the tilting frame. In an embodiment, the controlled relationship with the tilting frame permits the body to remain substantially parallel to the road surface. Accordingly, the vehicle can support a wider automobile-like body which will not contact the road surface when the tilting frame tilts while navigating a turn. In an embodiment, the body can be allowed to remain substantially parallel to and equidistant from the road surface while navigating a turn.

In an embodiment, the body of the vehicle is rigidly attached to a non-tilting portion of the suspension assembly, for example, mounted on a shock absorber support structure ("shock tower"), and the tilting frame is pivotally connected to the suspension assembly and a rear portion of the body. The tilting frame will preferably also support an engine which drives a rear wheel. The suspension assembly includes a parallelogram-based suspension assembly. Preferably, the vertices of the parallelogram-based suspension assembly are offset no more than about five inches from the center plane of an adjacent wheel.

In another embodiment, the body is moveably attached to the suspension assembly, and the suspension assembly utilizes a planar four bar linkage mechanism permitting the body to tilt, i.e., tilt in the same direction as the tilting frame by a predetermined angle so as to compensate for an opposite tilt in the suspension assembly. The net effect can be that the body remains substantially parallel to the road surface.

In another embodiment, the body is moveably attached to the suspension assembly and the suspension assembly utilizes a displacement mechanism which causes the body to move along a defined path so as to keep the body substantially parallel to and equidistant from the road surface.

In another embodiment, the vehicle includes a side-by-side pair of seats, each of the pair of seats is (a) pivotally connected to the body so as to permit rotation, and (b) pivotally connected to a linkage wherein another end of the linkage is pivotally connected to the tilting frame, the linkages configured to permit a desired tilt angle for the seats, as the tilting frame tilts. The tilt angle of the seats can be different from the tilt angle of the tilting frame so as to accommodate two side-by-side occupants without necessitating an excessively wide body.

These and other aspects, features, and advantages of the present invention will become apparent from the following detailed description of preferred embodiments, which is to be read in connection with the accompanying drawings.

DETAILED DESCRIPTION

Throughout the following description of the invention the modifiers "front", "rear", "left side" and "right side" are employed. It is to be understood that "front" as used herein refers to a side at the front of the vehicle (from where the driver is seated when the car is driven forwardly) and "rear" as used herein refers to the side opposite the front at the rear of the vehicle. The modifiers "left side" (denoted by "LS") and "right side" (denoted by "RS") as used herein refers to the left and right sides of the vehicle, respectively, as viewed by the driver of the vehicle seated facing the front of the vehicle. Thus, it is to be understood that these words are used according to their ordinary and usual meanings.

Figure 1:
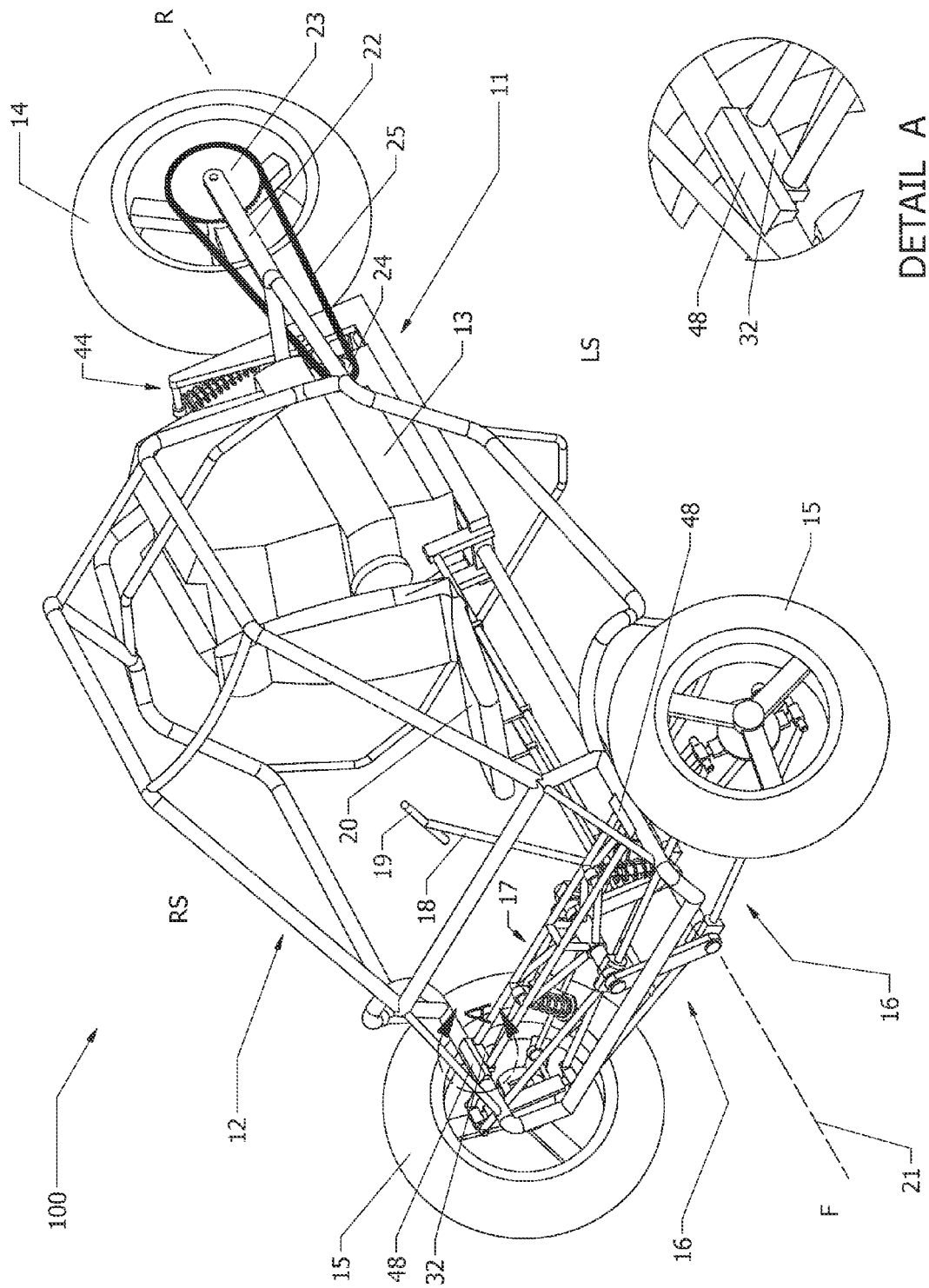
FIGS. 1 to 8 show a three-wheeled vehicle with a parallelogram-based suspension assembly having a body rigidly mounted on a shock absorber support structure and a tilting frame pivotally connected to the suspension assembly and a rear portion of the body, according to a preferred embodiment of the present invention.

Referring to FIG. 1, there is shown a perspective view of a three-wheeled vehicle 100, according to an embodiment of the present invention. The three-wheeled vehicle 100 includes a tilting frame 11 and a body 12. It is to be understood that the body 12 is shown as a tubular roll cage for illustrative purposes, and that the body 12 could be partially or completely enclosed supporting aerodynamically shaped body panels to improve its fuel efficiency and aesthetic appearance and provide amenities and safety features such as those commonly applied to, and appreciated in, automobiles. As will be described in greater detail, when the three-wheeled vehicle 100 is driven around a turn, the tilting frame 11 will "tilt" toward the inside of the turn while the body 12 will not. Importantly, the body 12 will remain almost parallel to the ground. This allows a wider (e.g., automobile-style) body to be utilized without concern that the body will contact the ground when navigating a turn.

The tilting frame 11 supports at least: an engine 13 that could be an internal combustion engine or an electric motor; a seat 20 for supporting an occupant; front wheels 15; a central rear wheel 14 suspended to the tilting frame 11 using a rear swingarm 22 which is pivotally connected to the tilting frame 11 and supported by a shock absorber assembly 44. As depicted, the rear wheel 14 is operatively connected to the engine 13 by means of a roller chain 25 and sprockets 23 and 24; however, any type of suitable drive system could be used, such as, for example, a belt or a shaft drive.

On each of the right side (RS) and the left side (LS) of the body 12, a side portion 48 rigidly connects a respective end 32 of a shock absorber support structure 17. Detail A shows a close-up view of this feature.

Figure 2:
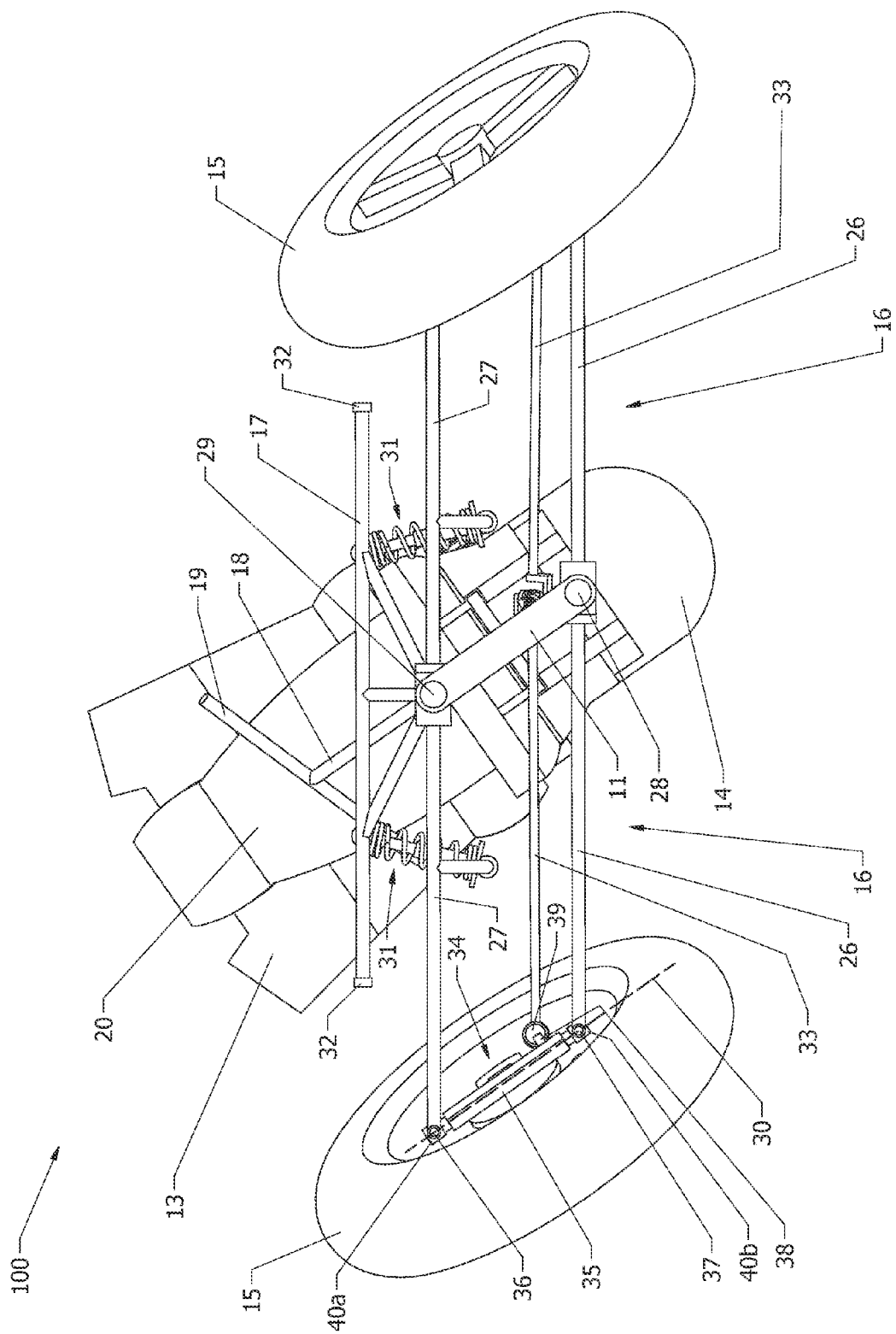

The shock absorber support structure 17 will be referred to hereinafter as a "shock tower" and could be constructed as an integral part of the body 12 instead of being a separate structure. A right and a left front suspension assembly 16 being a mirror image of each other with respect to a vertical plane passing through the longitudinal axis 21 is provided. Referring to FIG. 2, each suspension assembly 16 includes upper suspension arms 27, lower suspension arms 26, each one being rotatably connected to the tilting frame 11 at a front upper pivot 29 and a front lower pivot 28, respectively, and to an upper portion 40*a* and a lower portion 40*b* of the upright 35 of a right side and a left side wheel hub assembly 34 at an upper pivot 36 and a lower pivot 37, respectively. The front upper pivot 29 and the front lower pivot 28 are coplanar with the vertical plane passing through the axis 21 (shown in FIG. 1) when the vehicle is in its upright non-tilted posture. The upper arms 27 are suspended to the shock tower 17 via a right and a left shock absorber assembly 31. Each suspension assembly 16 formed in this manner is substantially shaped as a parallelogram (the four vertices of the parallelogram being the upper pivot 36 and the lower pivot 37 on each side of the suspension assembly 16, respectively), and is an independent suspension system with respect to the shock tower 17, thus also the body 12.

Figure 3:
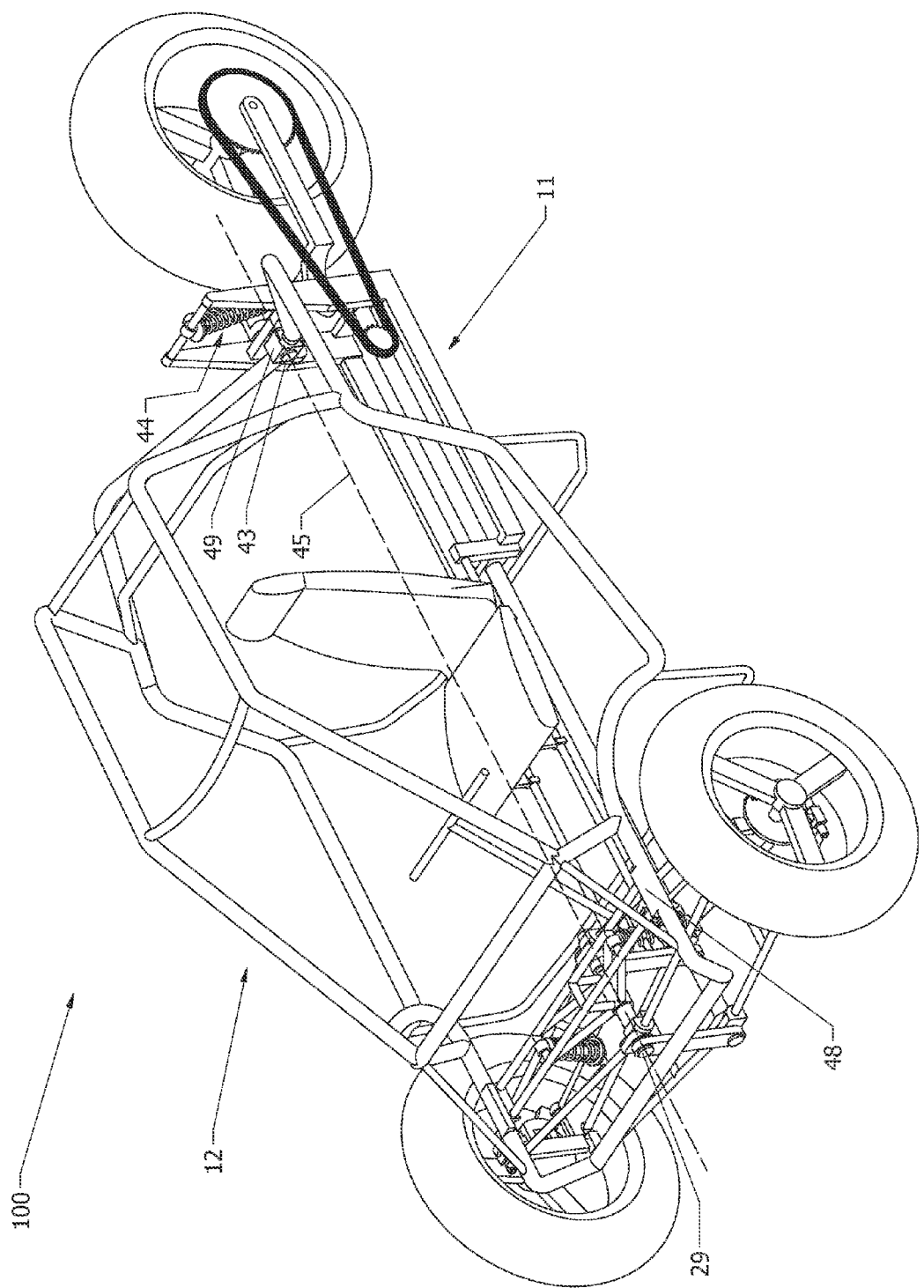
Figure 4:
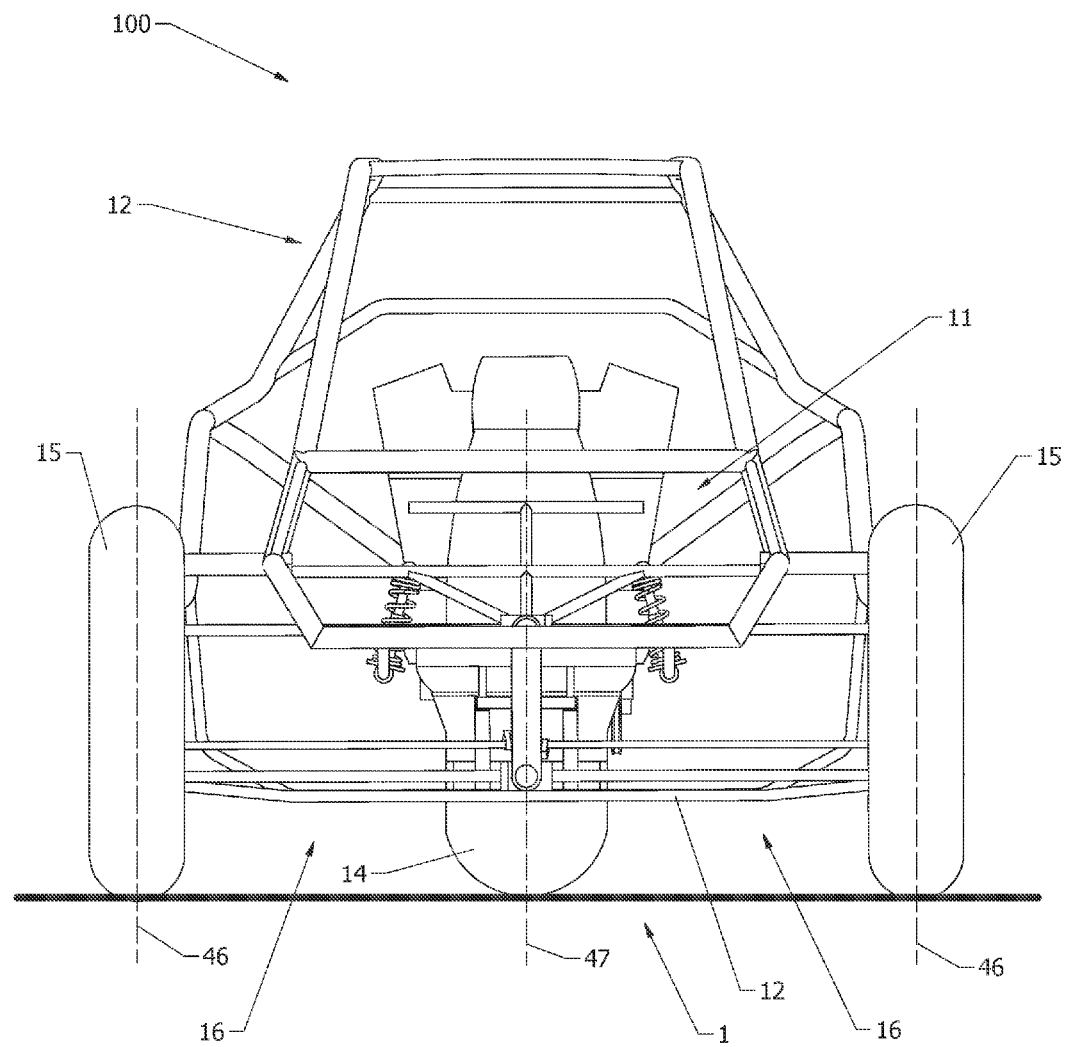

FIG. 3 illustrates another perspective view of the three-wheeled vehicle 100. As illustrated, the body 12 has at least one rear portion 49 rotatably connected to the tilting frame 11 at a rear pivot 43 that is coaxial with axis 45 of the front upper pivot 29. As shown in FIG. 4, the front wheels 15 each define a vertical axis 46 coplanar with the midplane of the torus formed by its respective wheel, as viewed when the vehicle 100 is in its non-titled upright posture, spaced apart and disposed opposite each other with respect to the longitudinal axis 21 (shown in FIG. 1) and parallel to a vertical axis 47 that is coplanar with the vertical plane passing thru axis 21 when the tilting frame 11 is in its upright non-tilted posture. When the vehicle 100 is in operation, the suspension assemblies 16 permit the tilting frame 11, and all the supported elements thereof, to lean to the right side and left side in a similar manner to a motorcycle when navigating a turn, while the body 12 remains substantially parallel to a road surface 1 and shifts to the right side or the left side of the tilt respectively, and the axes 46 of the front wheels 15 remaining substantially parallel to the axis 47 of the tilting frame 11 and to each other.

Figure 5:
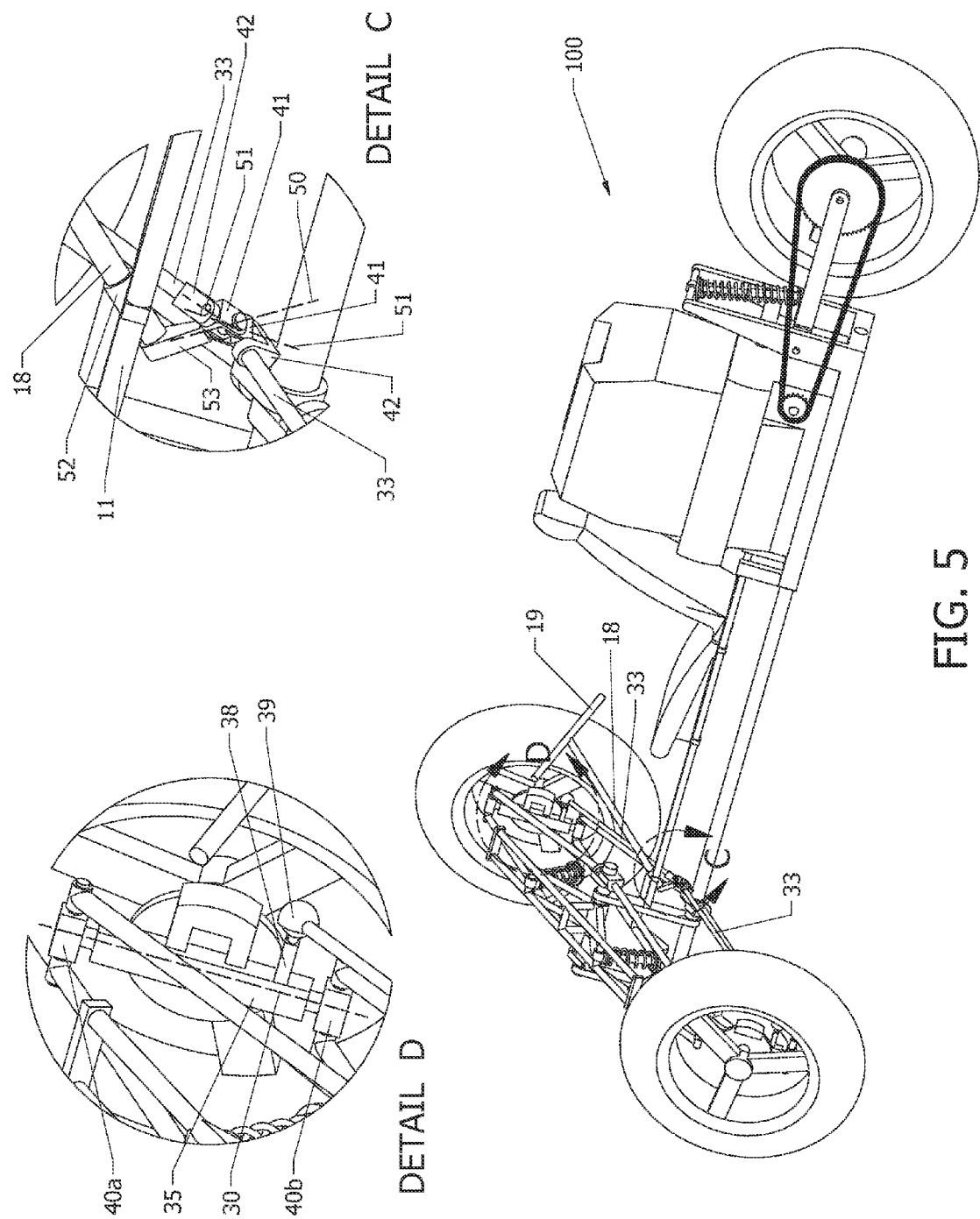

Referring to FIG. 5, steering is accomplished by turning a handlebar 19 connected to a steering column 18 which (as shown in Detail C) is rotatably attached to the tilting frame 11 via a bearing support 52. Steering column 18 has a lever 53 that is connected to a right and a left tie rod 33. At one end, each tie rod 33 has an L-shaped connector 42 pivotally connected to a U-shaped connector 41 so as to permit rotation about an axis 51 formed between each connector 42 and 41. Each U-shaped connector 41 is pivotally connected to lever 53 so as to permit rotation about axis 50. The arrangement of the connectors 42 and 41 permitting the axes of the left and right tie rods 33 to meet at one point on axis 50. The resulting connection is similar to a U-joint connection in function. At another end, each tie rod 33 is connected to a steering rod 38 via a ball joint 39 (as shown in Detail D). Each steering rod 38 is attached to its respective upright 35 of the wheel hub assembly 34.

As illustrated in Detail D, each upright 35 is pivotally connected to its upper portion 40*a* and lower portion 40*b* so as to form a steering axis 30. As a result when the handlebar 19 is turned right, the front wheels 15 are turned right, and when the handlebar 19 is turned left the front wheels 15 are turned left. Other types of steering mechanisms and linkages could be arranged, as long as an acceptable and wide range of steering motion is accomplished thru all angles of tilt of the tilting frame 11.

Other controls of the vehicle function such as tilt control, acceleration and braking could be accomplished using appropriate mechanisms. Such mechanisms are well known in the art and are not shown or described herein.

Foot rests or pegs could be provided either on the tilting frame 11 or the body 12 or both (not shown).

Figure 6:
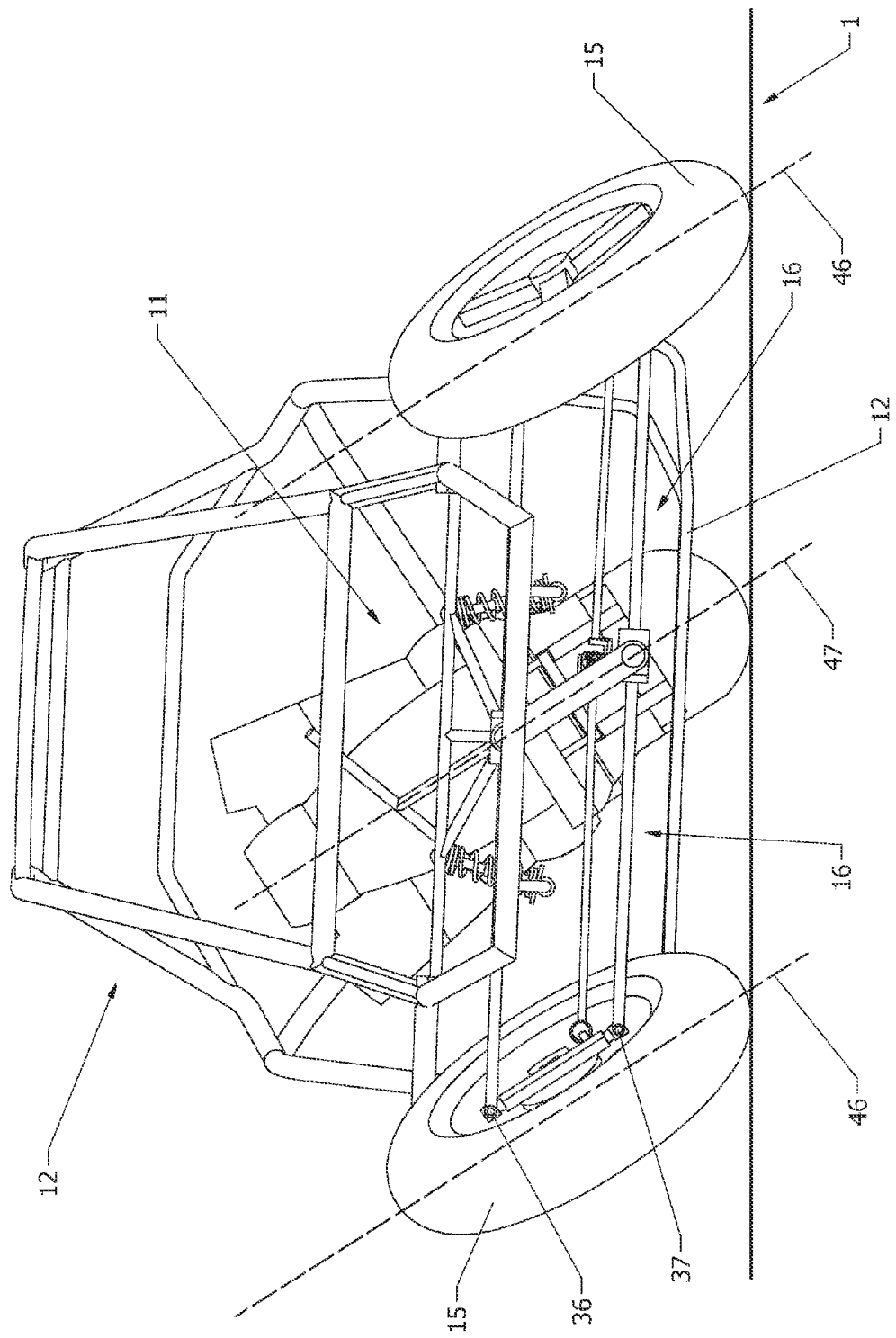
Figure 8:
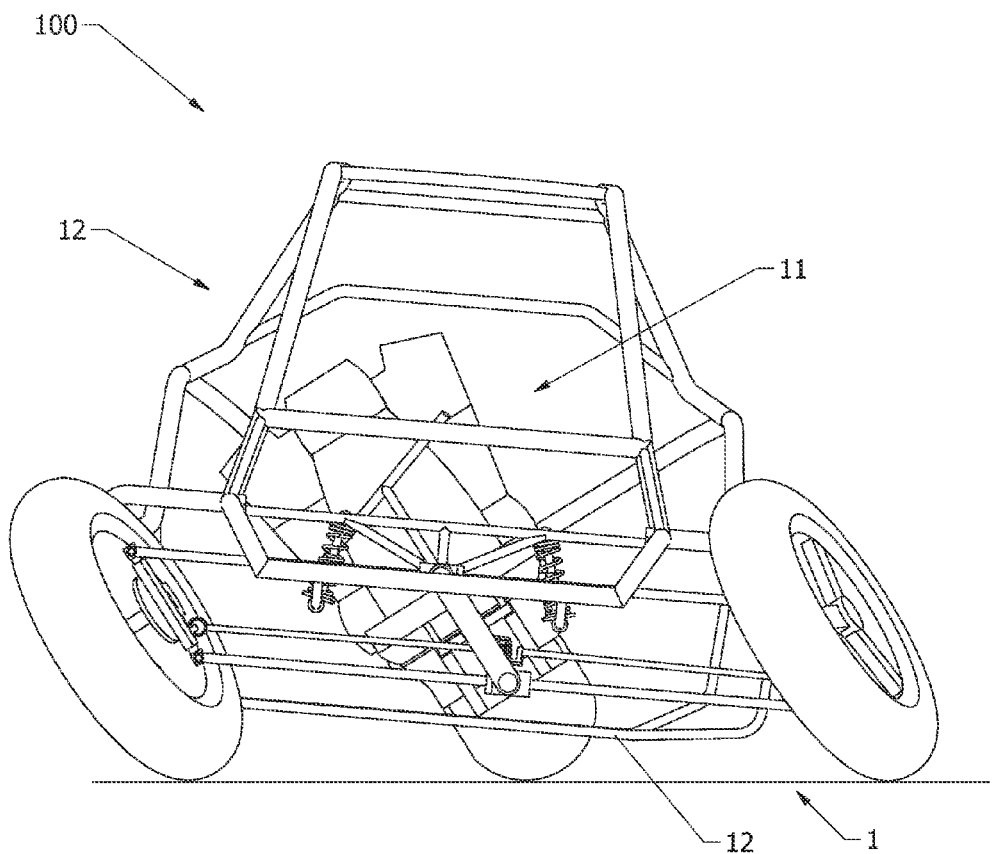

Referring to FIG. 6 and FIG. 8 it can be observed that the body 12 experiences a tilt in the opposite direction of the tilt of the tilting frame 11 with respect to road surface 1 when the tilting frame 11 leans as the vehicle 100 navigates a turn. The extent of this opposite-tilt of the non-titling body 12 is proportional to the distance between each axis 46 of each wheel 15 and its respective pivots 36 and 37.

Figure 7:
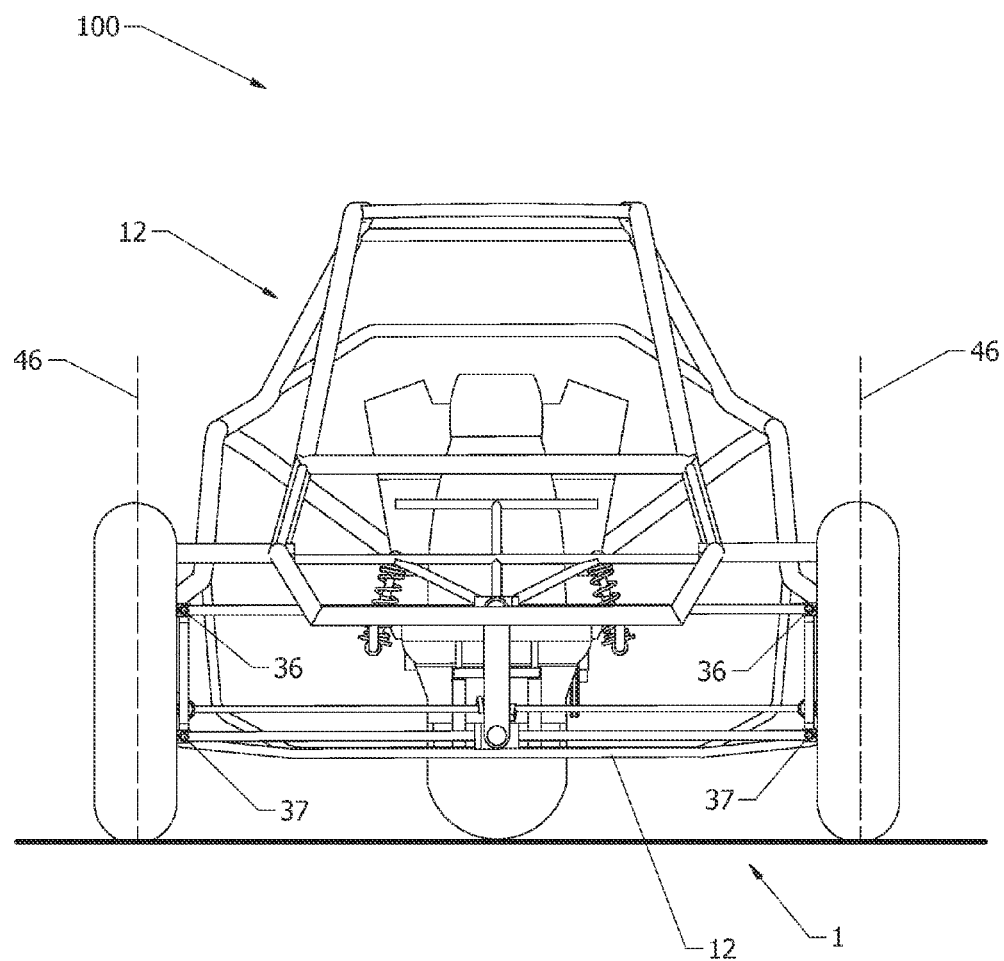

FIG. 7 shows the tilting three wheeled vehicle 100 according to the above embodiment with a greater proximal distance between axes 46 of the wheels 15 and pivots 36 and 37 of the suspension assemblies 16 than a tilting three wheeled vehicle 100 shown in FIG. 4. As a result a greater opposite tilt of the body 12 is observed in FIG. 8 (the vehicle of FIG. 7) than in FIG. 6 (the vehicle of FIG. 4) which creates a ground clearance problem and an aesthetically displeasing view of the vehicle 100, not to mention more interference with an occupant supported by seat 20 (shown in FIG. 1) on the tilting frame 11.

The greater the opposite tilt of the body 12 the more the ground clearance required when designing the vehicle 100 around this concept.

Placing pivots 36 and 37 at close proximity to the axes 46 treats (corrects) this opposite-tilt problem, however this may require specially designed wheel hub assemblies 34 and/or relatively large wheels 15 with special rims/wheels to accommodate pivots 36 and 37 within the wheels 15. Nonetheless, it is possible to reduce or even completely eliminate the opposite-tilt of the body 12 by taking the appropriate corrective measures.

Referring again to FIGS. 6 and 8, it can also be observed that aside from being shifted in the direction of the lean of the tilting frame 11, the body 12 is lowered making it closer to the road surface 1 when the vehicle 100 navigates a turn.

The amount of vertical reduction of ground clearance of the body 12 and its sideways shift are dependent on the vertical distance between the road surface 1 and the front upper pivots 36 that support the suspension arms 27 that in turn support shock tower 17.

The greater the distance between pivots 36 and the road surface 1 the greater the sideways shift and the downward shift (lowering) of the body 12 at any given tilt angle of the tilting frame 11. Therefore, if the body 12 is connected to a shock tower 17 that is connected to the front lower pivot 28 and a corresponding rear pivot, instead of the front upper pivot 29 and its corresponding rear pivot 43, the body 12 is shifted less in both the sideways and downward direction.

While it is desirable to have less downward shift of the body 12 to avoid interference with the road surface 1, the reduced sideways shift of the body 12, if the front lower pivot 28 is used, causes the body 12 to interfere with a tilting occupant supported by the seat 20 or even the engine 13, as the tilting frame 11 leans when the vehicle 100 navigates a turn, making it necessary for a wider than an optimized body 12 to accommodate a tilting occupant(s).

In view of the above observations, this embodiment should only be practiced when a very low body profile (like a sports car with ground effects) is not required, and when it is possible or practical to dispose pivots 36 and 37 of the suspension assemblies 16 at, or in very close proximity to (preferably no more than about 3 to 5 inches from), the central axes 46 of wheels 15

Figure 9:
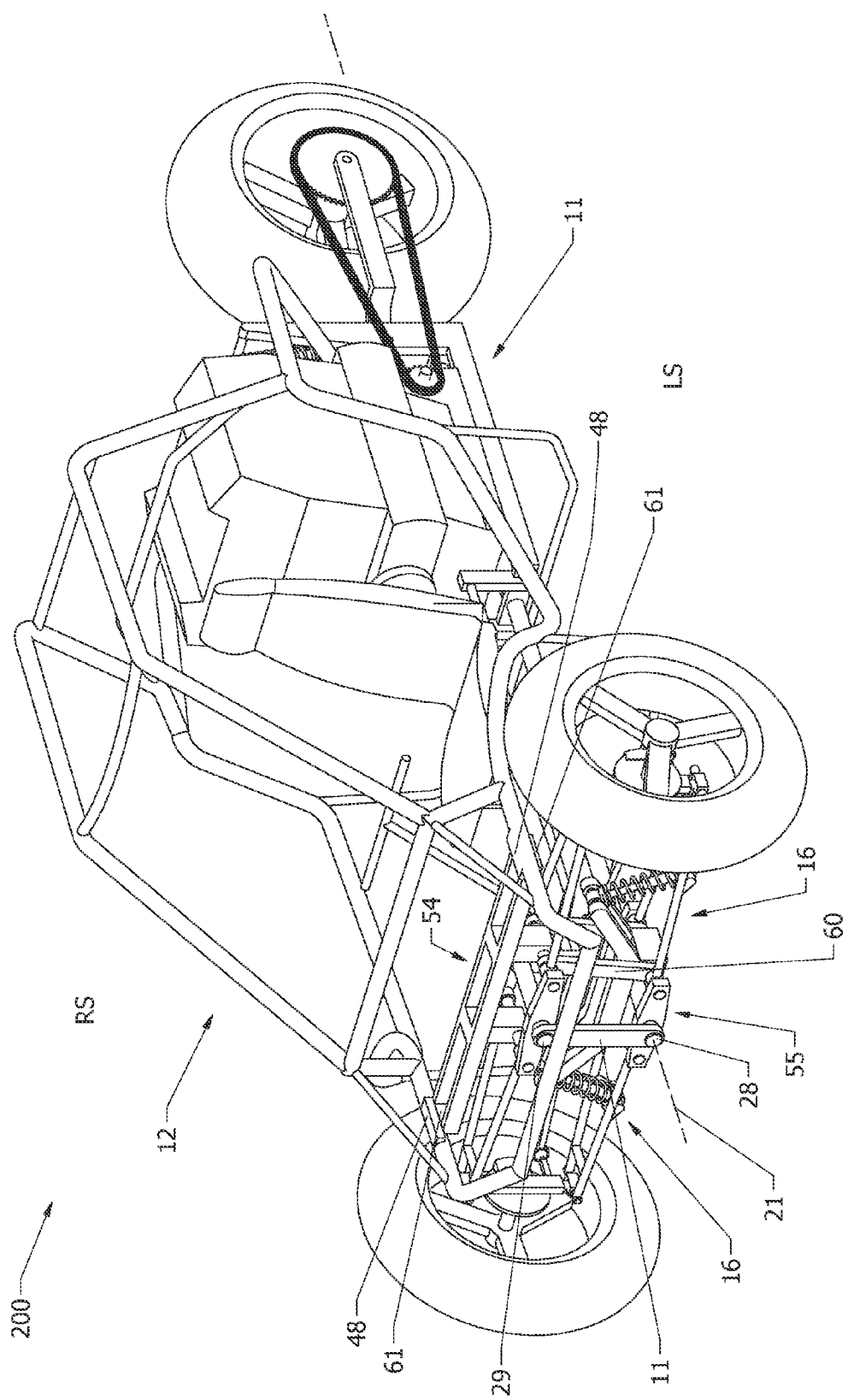
FIGS. 9 to 12 show the three-wheeled vehicle mounted on a body support structure with the suspension assembly utilizing a planar four bar linkage mechanism permitting the body to tilt in the same direction as the tilting frame by a predetermined angle so as to compensate for an opposite tilt, according to a preferred embodiment of the present invention.

Referring to FIG. 9, a perspective view of a tilting vehicle 200, according to another embodiment of the present invention, is illustrated. In this embodiment, perhaps because it was not practical or possible to place the pivots 36 and 37 at or in very close proximity to the axes 46 of the wheels 15, a different system is adapted in the front of the vehicle 100 to improve the parallelism of the body 12 to the road surface 1. The tilting vehicle 200 is configured in the same manner as the above described embodiment, with the following notable differences:

In this embodiment, the body 12 (shown as a tubular roll cage) includes a right side (RS) and a left side (RS) front portion 48 with respect to the longitudinal axis 21 rigidly connected to a body support structure 54 at a respective right side (RS) and left side (LS) portion 61. Body support structure 54 could be constructed as an integral part of body 12.

Figure 10:
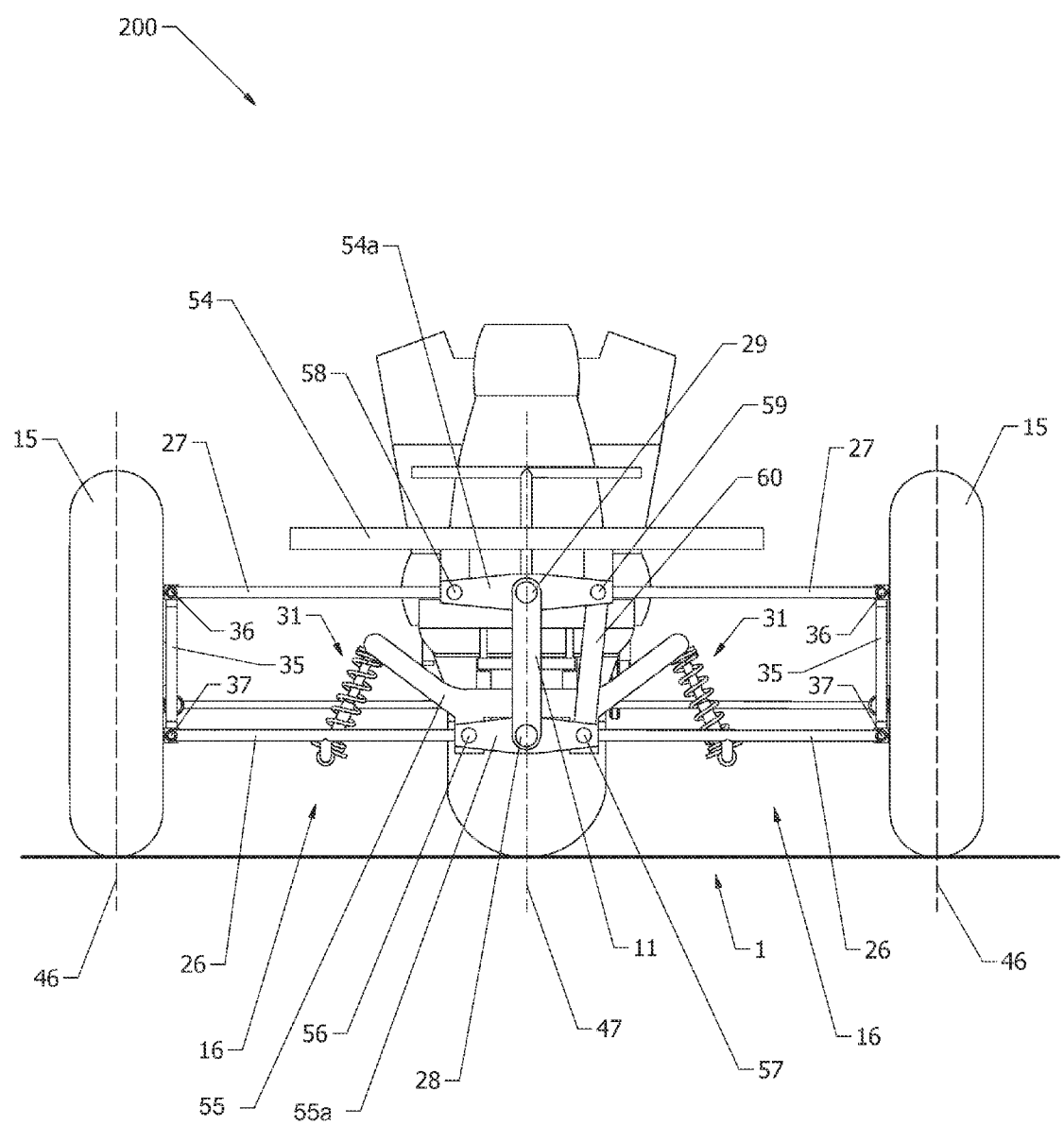

Referring to FIG. 10, a front view of the vehicle 200 in its upright non-tilted posture with body 12 removed is illustrated.

As shown, pivots 36 and 37 are disposed offset inboard from respective axes 46 of the wheels 15 by a considerable proximal distance to reflect a practical position achievable by using commonly manufactured wheel hub assemblies.

A middle portion of the body support structure 54a is rotatably connected to the tilting frame 11 at the front upper pivot 29. The middle portion of the body support structure 54a supports a right side pivot 58 and a left side pivot 59, the axes of which are coplanar with a horizontal plane passing thru the axis of the front upper pivot 29, spaced apart by a first preferred distance from the pivot 29.

A middle portion of a shock tower 55a is rotatably connected to the tilting frame 11 at the front lower pivot 28. The shock tower 55 supports a right side pivot 56 and a left side pivot 57, the axes of which are coplanar with a horizontal plane passing thru the axis of the front lower pivot 28, spaced apart by a second preferred distance from pivot 28.

At least one linkage bar 60 is rotatably connected to the pivot 57 at one end and the pivot 59 at another end.

Linkage bar(s) 60 could be connected to pivots 56 and 58 instead of pivots 57 and 59.

The length of the linkage bars 60 is chosen to permit the horizontal plane passing thru the axes of pivots 58, 59, and 29 to be substantially parallel to the horizontal plane passing thru the axes of pivots 56, 57, and 28 when the tilting frame 11 is in its upright non-tilted posture.

The right and left upper suspension arms 27 of suspension assemblies 16 are rotatably connected to their respective pivots 36 and to pivots 58 and 59 respectively.

The right and left lower suspension arms 26 of the suspension assemblies 16 are rotatably connected to their respective pivots 37 and to pivots 56 and 57 respectively.

The lengths of suspension arms 27 and 26 are chosen so that axes 46 of wheels 15 are substantially parallel to the axis 47, and therefor to each other, when the tilting frame 11 is in its upright non-tilted posture.

The distance between pivots 36 and 37 is equal to the distance between pivots 28 and 29.

The lower suspension arms 26 are suspended to the shock tower 55 via shock absorber assemblies 31.

As observed in this embodiment, a planar four bar linkage mechanism is formed because of the connections between pivots 28, 57, 59, and 29. By using the appropriate kinematic equations and/or experimentation, the ratio between the first preferred distance (between pivot 59 and pivot 29), and the second preferred distance (between pivot 57 and pivot 28) is determined so that when the tilting frame 11 tilts, the above mentioned four bar linkage system permits the body support structure 54, thus the body 12, to tilt, with respect to the shock tower 55, in the same direction of the tilt of the tilting frame 11 by a predetermined angle so as to compensate for the opposite-tilt of the shock tower 55.

Figure 11:
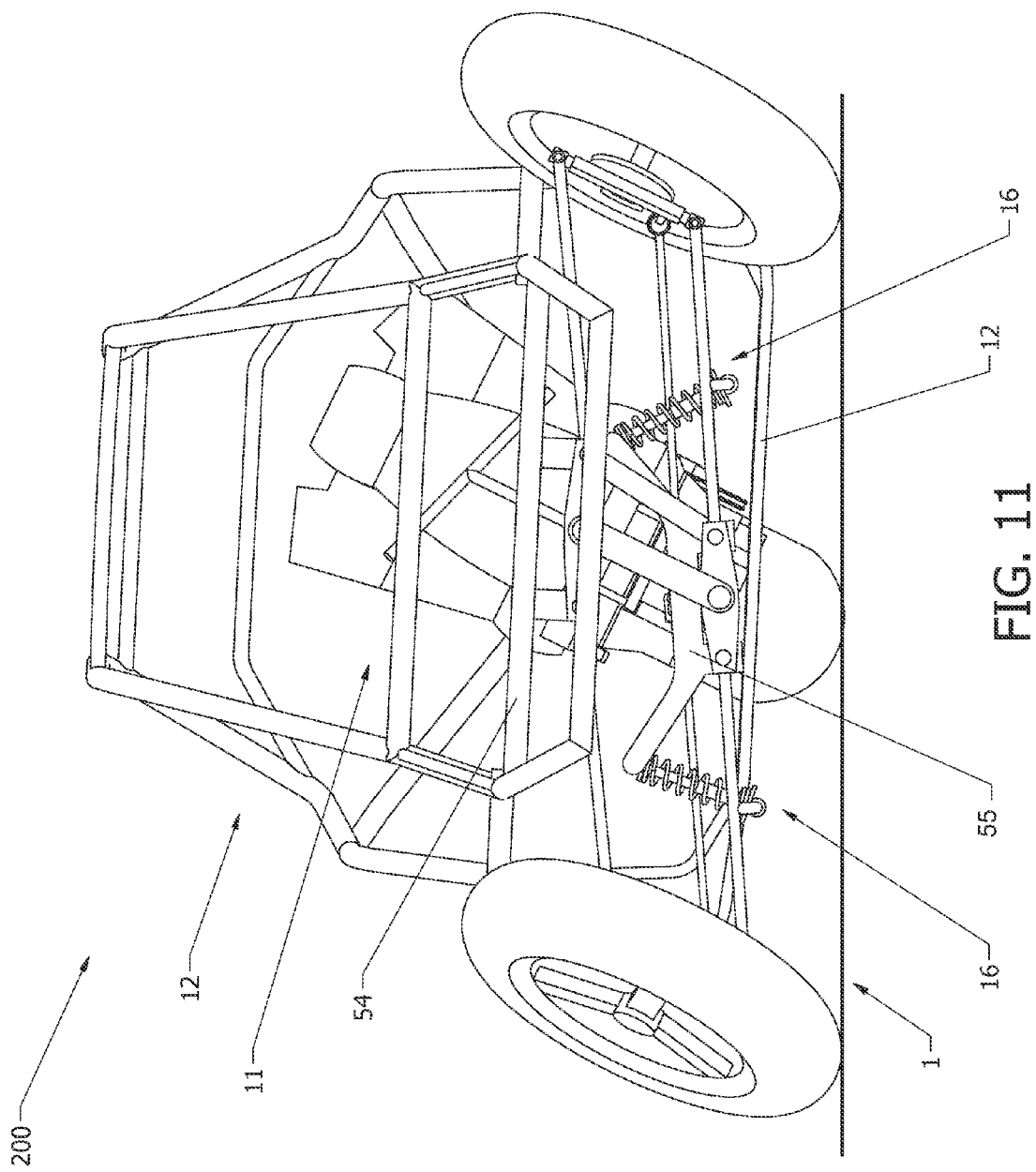
Figure 12:
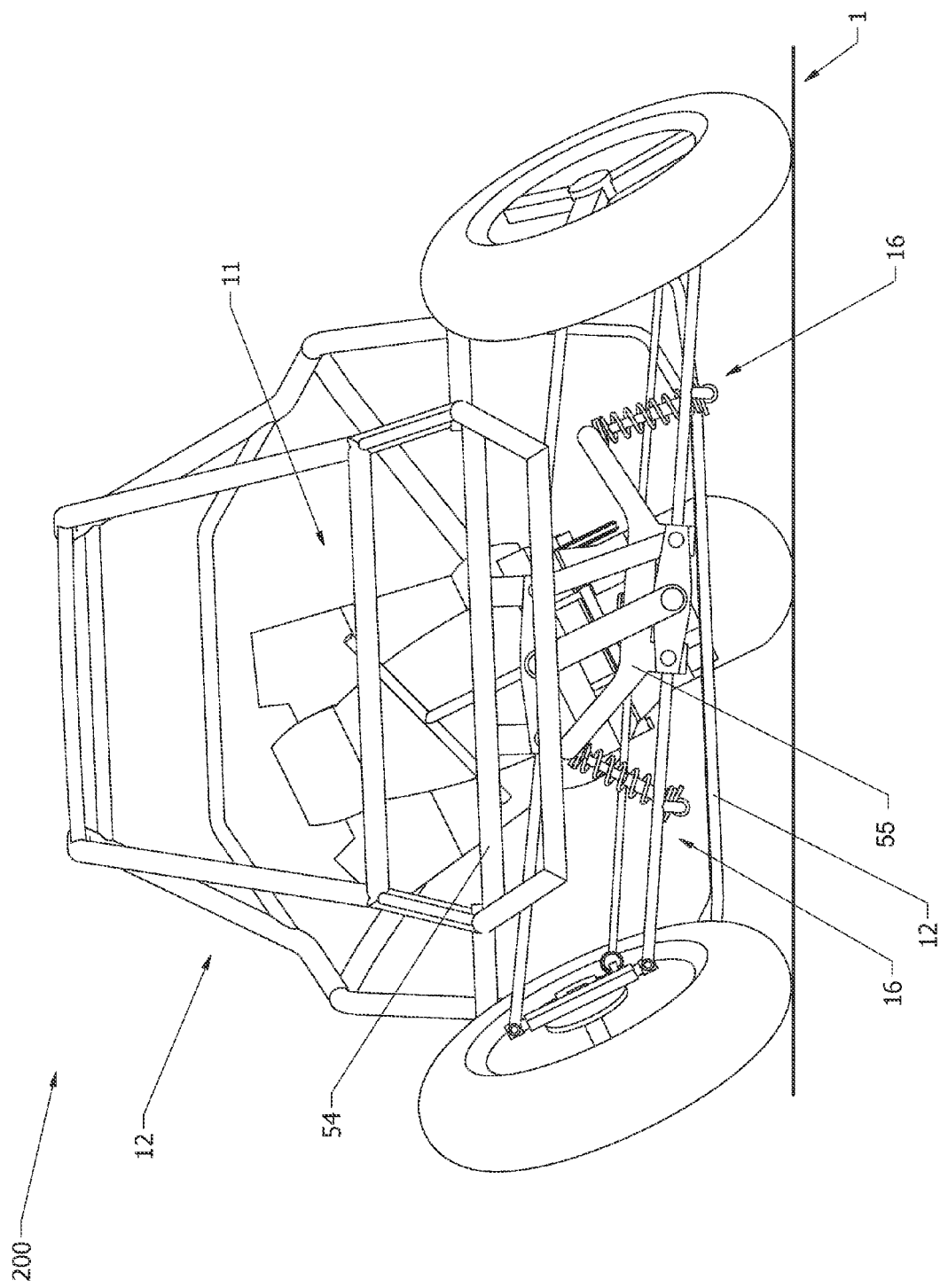

As a result, when the vehicle 200 navigates a turn, and the tilting frame 11 tilts in the direction of the turn, the body 12 can be maintained substantially parallel to the road surface 1, or if desired, as shown in FIG. 11 and FIG. 12, a slight tilt of the body 12 can be allowed inward the lean (in the direction and throughout all ranges of tilt of the tilting frame 11) so as to provide even more head room for a tilting occupant(s) supported on the tilting frame 11 and/or to compensate for any rolling moments that might affect body 12 depending on the center of gravity location of the body 12 and the vehicle tilt control design (forced tilt control or free leaning).

Yet in another embodiment, where an extremely low body profile is desired (like a sports car with ground effects), a movable connection(s) and a displacing mechanism(s) can be arranged to permit body 12 to shift in the direction of the lean while remaining substantially parallel to and equidistant from the road surface 1 as the tilting frame 11 tilts when the vehicle navigates a turn.

Figure 13:
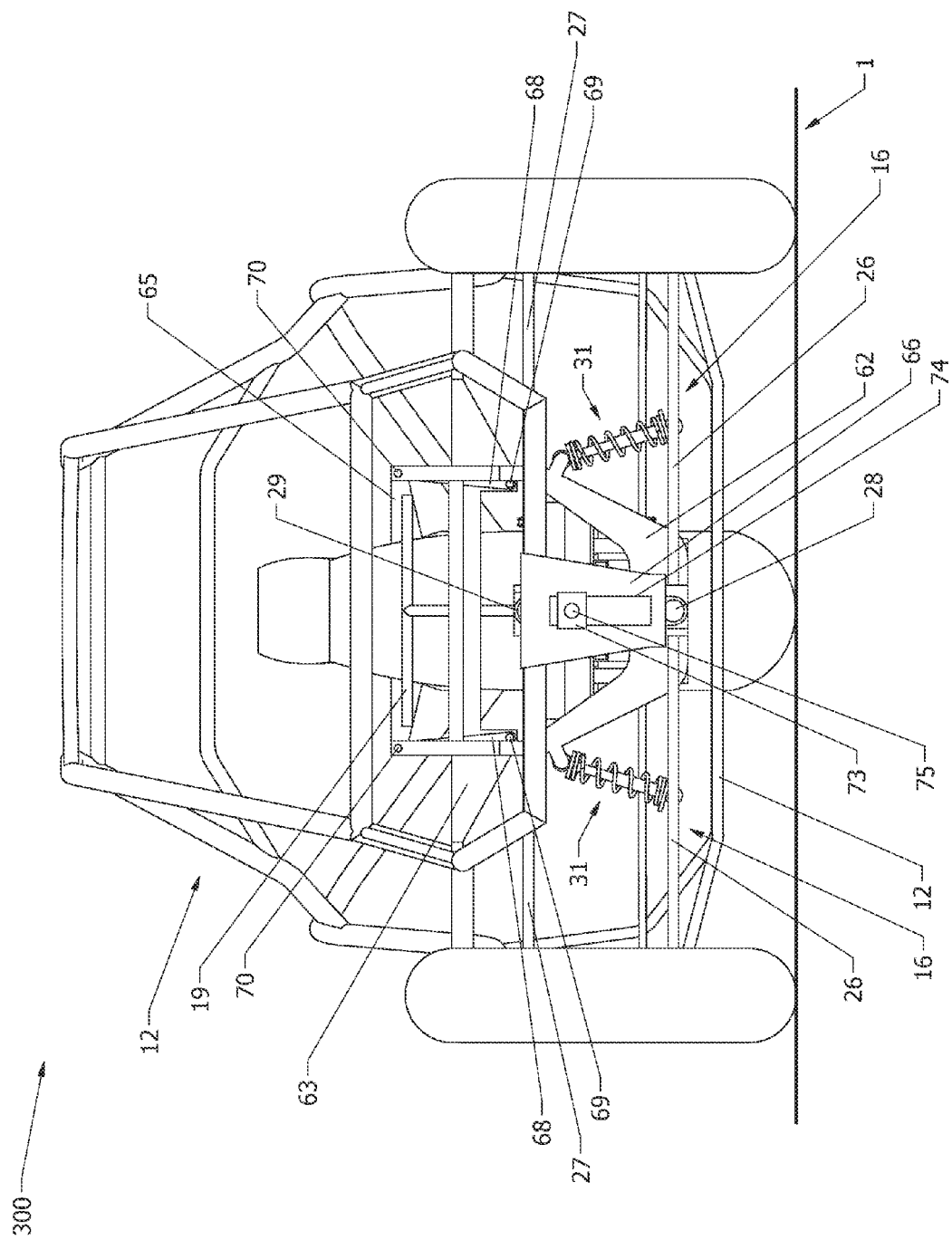
FIGS. 13 to 16 show the three-wheeled vehicle moveably mounted on a shock absorber support structure with the suspension assembly utilizing a displacement mechanism which causes the body to move along a path so as to keep the body in a controlled relationship with the tilting frame wherein the body remains substantially parallel to and equidistant from the road surface, according to a preferred embodiment of the present invention.

Referring to FIG. 13, a front view of a tilting vehicle 300, according to another embodiment of the present invention, is illustrated. In this embodiment, the vehicle 300 is configured as in the other embodiments previously discussed, with the following differences:

A middle portion of a shock tower 62 is rotatably connected to the front lower pivot 28.

The lower suspension arms 26 are suspended to the shock tower 62 via shock absorber assemblies 31.

A front portion 63 of the body 12 is movably connected to the shock tower 62 as follows:

At one end, a front right and a front left linkages 68 are rotatably connected to a right side and a left side portion of the front portion 63 of the body 12 via a right side and a left side pivot 69, respectively. Pivots 69 are spaced apart by a first preferred distance.

At another end, the front right and front left linkages 68 are rotatably connected to a right side and a left side portion of the shock tower 62 via a right side and a left side pivot 70, respectively. Pivots 70 are spaced apart by a second preferred distance.

A front displacing mechanism is formed as follows:

A front portion 66 of the body 12 supports a linear motion system represented by linear motion path 74 and a linear bearing block 73 (any type of suitable linear motion system can be used), where block 73 slides up and down within path 74.

Figure 14:
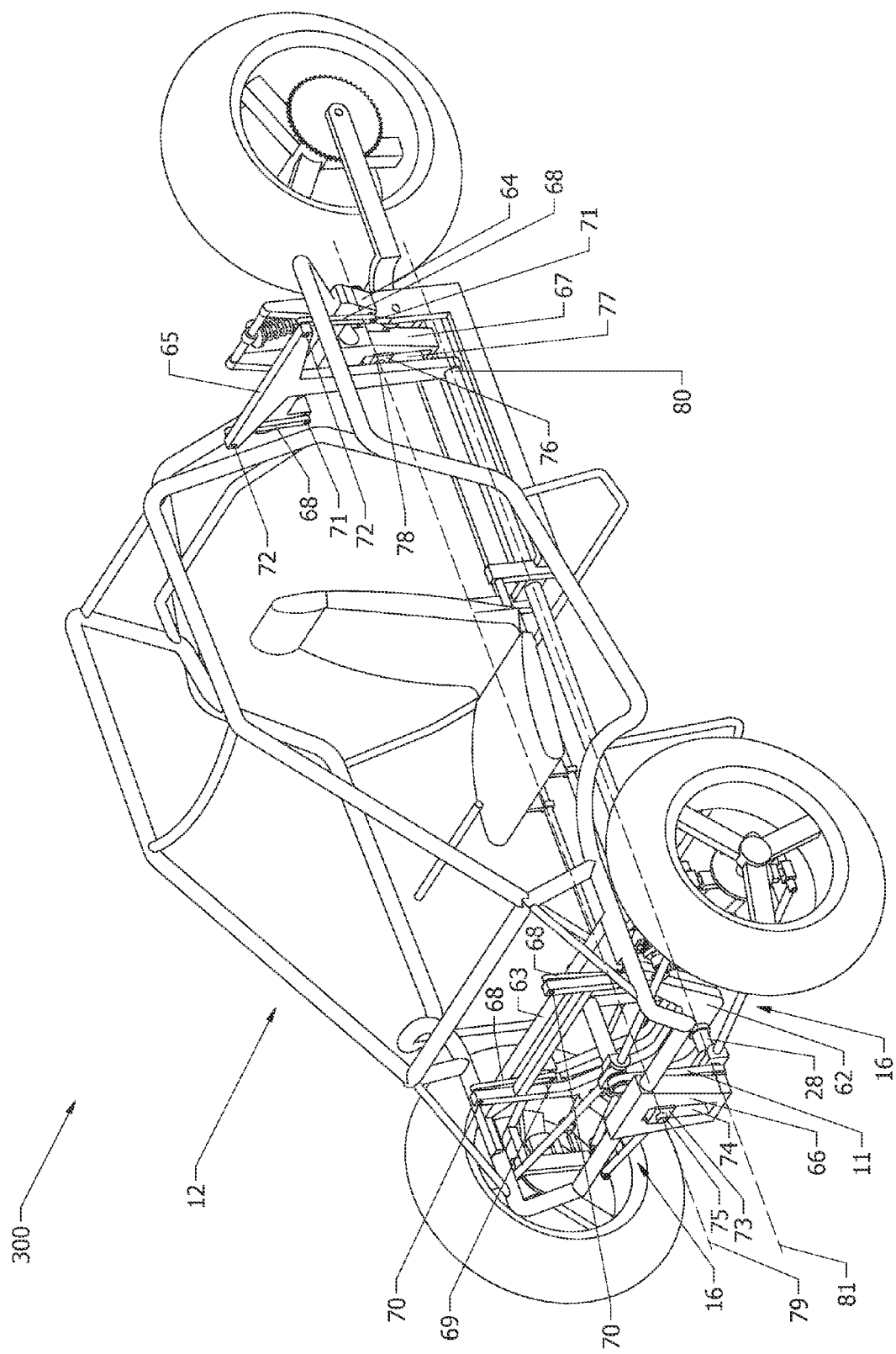

Referring to FIG. 14, a perspective view of vehicle 300 in its upright non-tilted posture with the engine and chain drive removed:

A lever 75 is pivotally connected to linear motion block 73 and rigidly affixed to the tilting frame 11.

A rear portion 64 of the body 12 is movably connected to a T-shaped structure 65 as follows:

At one end, a rear right and a rear left linkages 68 are rotatably connected to a right side and a left side portion of the rear portion 64 of the body 12 via a right side and a left side pivot 71, respectively. Pivots 71 are spaced apart by the same first preferred distance between pivots 69.

At another end, the rear right and rear left linkages 68 are rotatably connected to a right side and a left side portion of the T-shaped structure 65 via a right side and a left side pivot 72, respectively. Pivots 72 are spaced apart by the same second preferred distance between pivots 70.

Pivots 71 and 72 are coaxial with their corresponding pivots 69 and 70.

The T-shaped structure 65 is rotatably connected to the tilting frame 11 at a pivot 80 that is coaxial with axis 81 of the lower front pivot 28.

A rear displacing mechanism is formed as follows:

A rear portion 67 of the body 12 supports a linear motion system represented by linear motion path 77 and a linear bearing block 76, where block 76 slides up and down within path 77.

A lever 78 is pivotally connected to linear motion block 76 and rigidly affixed to the tilting frame 11.

The axis of lever 75 and the axis of lever 78 are coaxial with an axis 79 which is coplanar with a vertical plane passing thru the middle of the tilting frame 11 when it is in its upright non-tilted posture.

Figure 15:
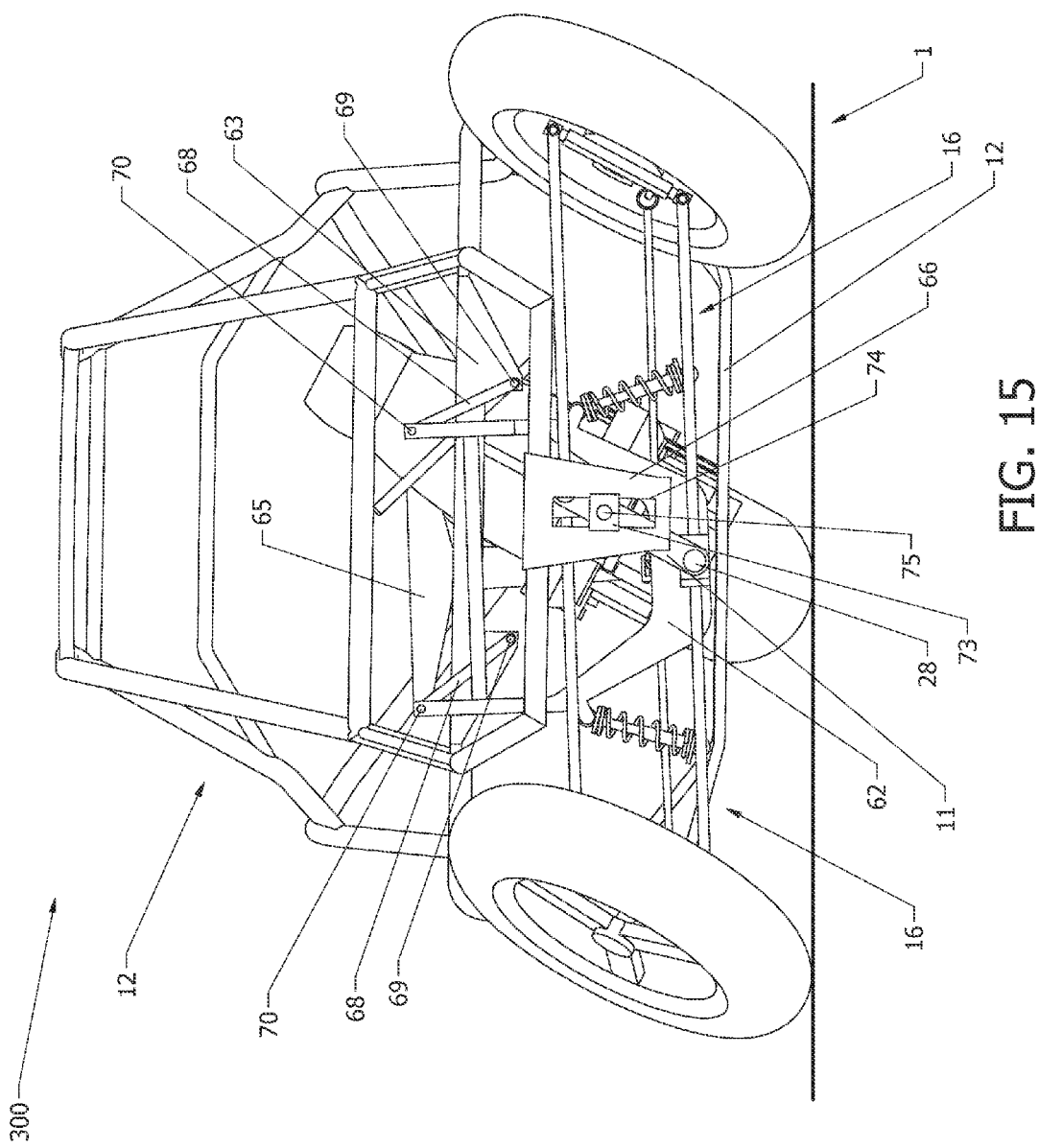
Figure 16:
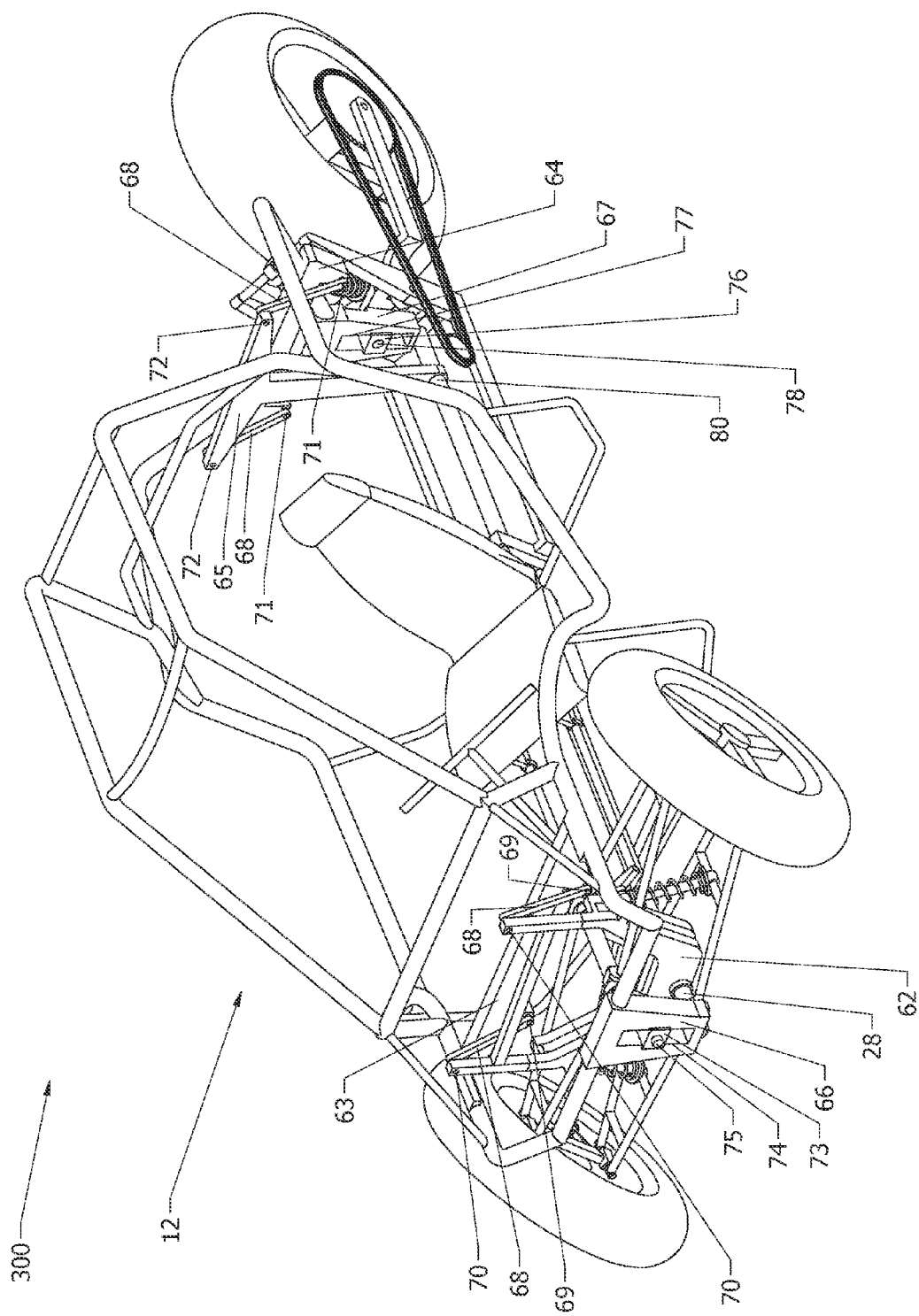

Referring to FIG. 15 and FIG. 16, a perspective view and a front view, respectively, of the vehicle 300 in its tilted posture are illustrated.

In operation, when the titling frame 11 tilts, levers 75 and 78 exert a force against the linear blocks 73 and 76, respectively. This causes the body 12 to move along a path defined by the linkage mechanisms formed by linkages 68 and their respective pivotal connections. By using the appropriate kinematic equations and/or experimentation, the ratio between the first preferred distance (between pivots 69) and the second preferred distance (between pivots 70), and the lengths of linkages 68, are calculated to provide a path of movement that maintains the body 12 substantially parallel to and equidistant from the road surface 1. Optionally, a slight tilt of the body 12 in the direction of the tilt of the tilting frame 11 can be achieved, to provide more head room for a tilting occupant(s).

It should be understood that this parallelism and equidistance of the body 12 is optimized when the vehicle is in static mode (standing still). As the vehicle is driven, the dynamic forces (acceleration, braking, lateral forces, road surface irregularities affecting the shock absorbers, etc.) affecting the vehicle will vary this parallelism and equidistance.

In another embodiment (not shown), where it is desired to practice the present invention with a narrower body, any of the above embodiments can be modified where a seat is provided (or multiple seats arranged inline) and said seat is pivotally connected to the tilting frame or the body and a mechanism(s) is provided to connect the seat to either the tilting frame or the body (depending where the seat is mounted), so that when the tilting frame tilts, the seat tilts at a different angle (preferably a smaller angle) than that of the tilting frame thus accommodating a narrower body.

Yet in another embodiment, any of the above embodiments can be modified to support at least two independently tilting seats arranged side by side for a more convenient and pleasing seating of the occupants.

Figure 17:
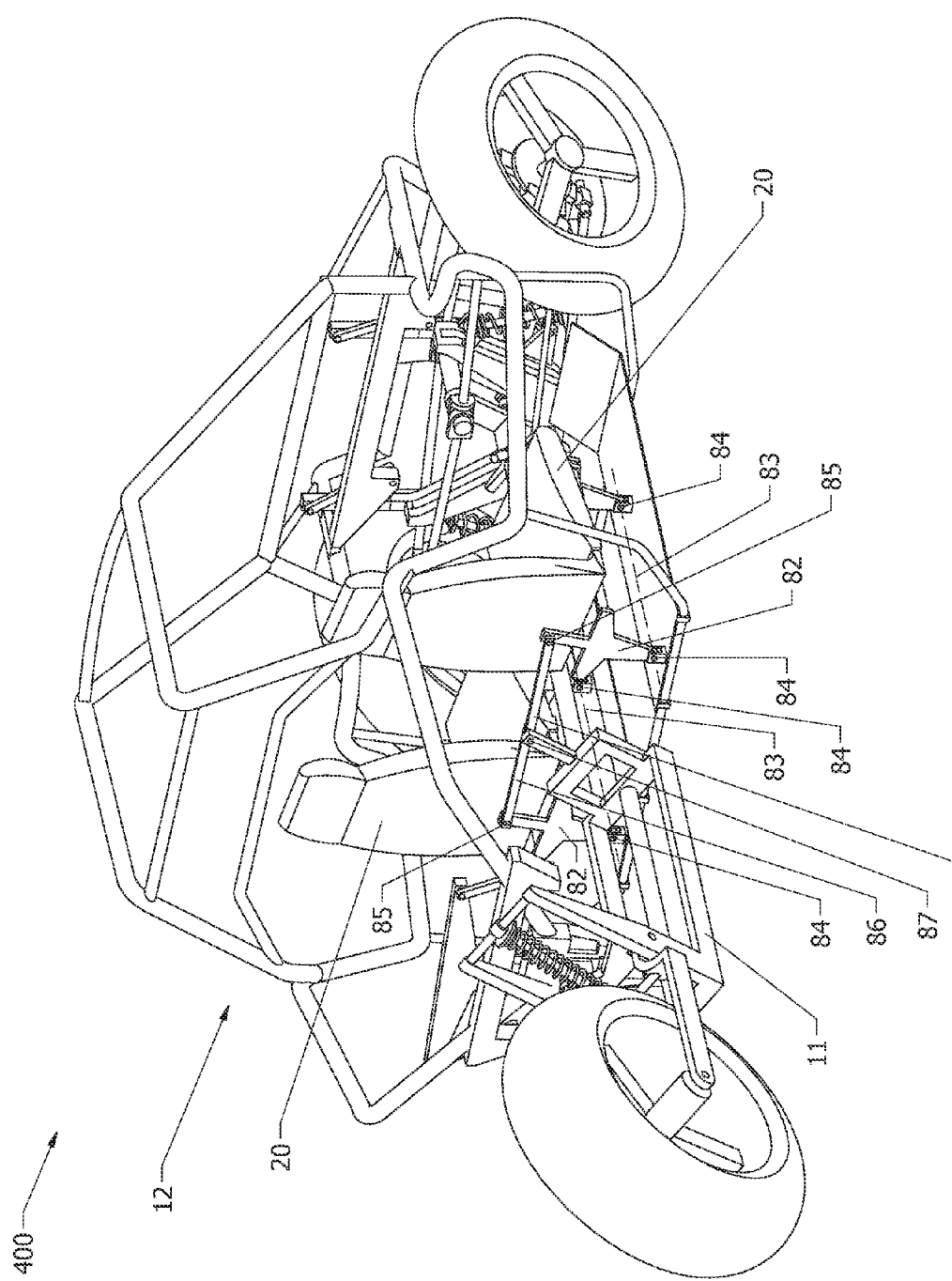
FIGS. 17 and 18 show the vehicle of FIG. 13 supporting two side-by-side passenger seats, according to a preferred embodiment of the present invention.

FIG. 17, a perspective view, shows a vehicle 400 with the engine removed and two seats 20 arranged side by side and affixed to support structures 82, the vehicle 400 being identical to the vehicle 300 in all other respects.

Seat support structures 82 are rotatably connected to the body 12 at pivots 84 so as to permit rotation about longitudinal axes 83.

At one end, linkages 86 are connected rotatably to seat support structures 82 at pivots 85.

At another end, linkages 86 are connected rotatably to the tilting frame 11 at a pivot 87.

In operation, when the tilting frame 11 tilts, the linkages 86 exert a force against seat support structures 82 forcing them to tilt in the same direction. By using the appropriate kinematic equations and/or experimentation, the lengths of linkages 86 and the position of the pivotal connections 85 and 87 are configured to permit a desired tilt angle for the seats 20. This tilt angle of seats 20 is preferably less than that of the tilting frame 11 to accommodate two side by side occupants without necessitating an excessively wide body 12.

It should be understood that it might not be possible do design a free leaning (like a motorcycle) vehicle according to this embodiment (side by side seating) as this would present a challenge in balancing the vehicle therefor a tilt control mechanism should be implemented.

Figure 18:
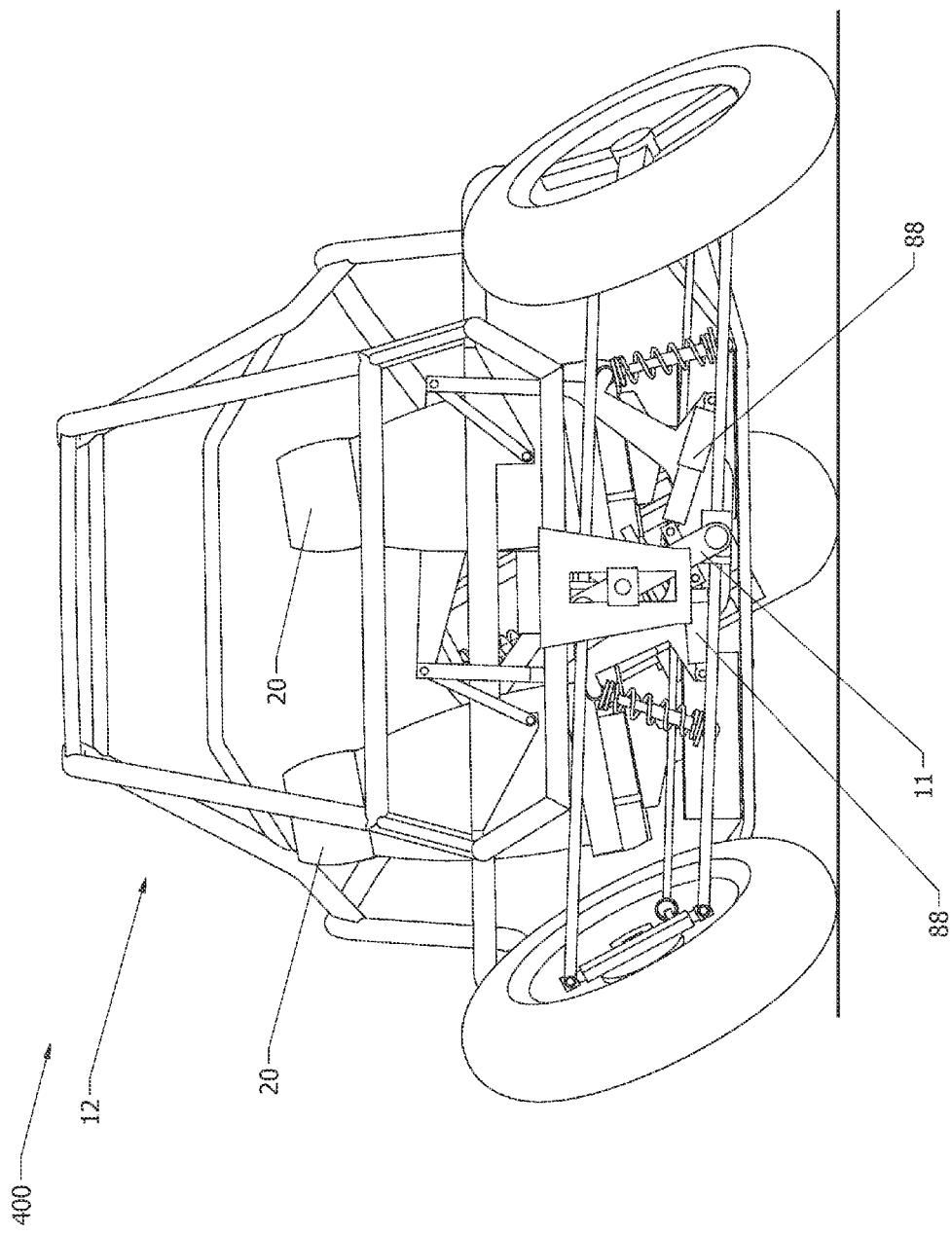

FIG. 18, a front view of the vehicle 400 configured with two side by side seats 20 in its tilted posture, the seats 20 are shown to have a lesser tilt angle than that of the tilting frame 11. It is also possible to arrange the linkages 86 and their pivotal connections to allow each seat to have a tilt angle independent of the other.

There is also shown two linear actuators 88 connected between the tilting frame 11 and a non-tilting portion of the vehicle 400. These actuators could be electromechanical, pneumatic, or hydraulic, controlled by the operator or automatically by an electronic control unit that uses feedback from sensors (such as speed, lateral forces, steering angle, etc.). Such tilt control mechanisms are well known in the prior art and will not be discussed in further detail.

The vehicle controls (not shown) such as acceleration, braking, and steering controls for this embodiment, specifically the steering handlebar or wheel, could be mounted on the body 12 or on a support structure (not shown) that tilts at the same angle as that of the seats 20 using similar mechanisms as those used for tilting the seats 20.

The steering wheel or handlebar could be connected to the steering mechanism (described in detail with respect to the vehicle 100) via telescoping shafts/columns, gear boxes/reducers, universal joints, cv joints, or double cardan joints to accomplish an acceptable steering motion. Such arrangements are well known in the prior art and are not shown or discussed here in detail.

In view of the above, it should be appreciated that the usefulness of the present invention is in adapting a variety of mechanisms to make possible the implementation of an optimized body with a multi wheeled titling vehicle frame where said body remains substantially parallel and/or equidistant to/from the road surface to improve safety, performance, aesthetics, and comfort for its occupants, ultimately increasing the usefulness and marketability of multi-wheeled tilting vehicles.

It should also be noted that all the above embodiments could be modified in many ways, and other mechanisms than have been shown could be used to achieve the same results, and/or they could be designed to have four wheels and/or be used with other types of suspension systems known or later developed and commonly used with tilting multi-wheeled vehicles, and doing so does not constitute a departure from the principles and scope of the present invention.

What is claimed is:

1. A vehicle having at least three wheels, comprising:
   a tilting frame rotatably connected to a suspension assembly at a first pivot;
   a body rotatably connected to the tilting frame at a second pivot and to the suspension assembly, wherein the body is structured to cover the tilting frame and the second pivot being substantially coaxial with an axis of the first pivot; and
   wherein the suspension assembly is structured and arranged to permit a pair of the wheels to tilt with the tilting frame, but not the body, as the tilting frame tilts.

2. The vehicle of claim 1, wherein the pair of the wheels remain substantially parallel to the tilting frame when the tilting frame tilts.

3. The vehicle of claim 1, wherein the body is rigidly attached to a non-tilting portion of the suspension assembly.

4. The vehicle of claim 3, wherein the non-tilting portion of the suspension assembly wherein the body is rigidly attached is a shock absorber support structure.

5. The vehicle of claim 1, wherein the tilting frame is pivotally connected to the suspension assembly.

6. The vehicle of claim 1, wherein the tilting frame supports at least one seat and an engine.

7. The vehicle of claim 1, wherein the body has a controlled relationship with the tilting frame, as the tilting frame tilts.

8. The vehicle of claim 7, wherein the controlled relationship allows the body to remain substantially parallel to the road surface.

9. The vehicle of claim 1, wherein one wheel of the pair of wheels is disposed on the left side of the vehicle and the other wheel of the pair of wheels is disposed on the right side of the vehicle.

10. The vehicle of claim 9, wherein another wheel of the vehicle is suspended to the tilting frame at the rear of the vehicle.

11. The vehicle of claim 1, wherein the suspension assembly includes a parallelogram-based suspension assembly.

12. The vehicle of claim 11, wherein vertices of the parallelogram-based suspension assembly are offset inward no more than about five inches from the center plane of an adjacent wheel.

13. The vehicle of claim 1, wherein the body is moveably attached to the suspension assembly and the suspension assembly includes a planar four bar linkage mechanism permitting the body to tilt in the same direction as the tilting frame by a predetermined angle so as to compensate for an opposite tilt.

14. The vehicle of claim 1, wherein the body is moveably attached to the suspension assembly and the suspension assembly includes a displacement mechanism which permits the body to move along a defined path in a controlled relationship with the tilting frame, as the tilting frame tilts.

15. The vehicle of claim 14, wherein the controlled relationship allows the body to remain substantially parallel to and equidistant from the road surface.

16. The vehicle of claim 1, further comprising a side-by-side pair of seats, each of the pair of seats is pivotally connected to the body, and a linkage is pivotally connected between the tilting frame and each seat, wherein the linkages are configured to permit a desired tilt angle for the seats, as the tilting frame tilts.

17. The vehicle of claim 16, wherein the tilt angle of each of the seats is different from the tilt angle of the tilting frame and the body.

18. A vehicle having at least three wheels, comprising:
   a suspension assembly, including a parallelogram-based suspension assembly;
   a tilting frame supporting at least one seat, the tilting frame pivotally attached to the suspension assembly at a first pivot; and
   a body rotatably connected to the tilting frame at a second pivot and rigidly attached to a shock absorber support structure of the suspension assembly, wherein the body is structured to cover the tilting frame and the second pivot being substantially coaxial with an axis of the first pivot;

wherein the suspension assembly is structured and arranged to permit a transversely dispose pair of the wheels to tilt with the tilting frame, but not the body, as the tilting frame tilts.

19. A vehicle having at least three wheels, comprising:

a suspension assembly;

a tilting frame supporting at least one seat, the tilting frame pivotally attached to the suspension assembly at a first pivot; and a body rotatably connected to the tilting frame at a second pivot and moveably attached to the suspension assembly;

wherein the body is structured to cover the tilting frame and the second pivot being coaxial with an axis of the first pivot;

wherein the suspension assembly is structured and arranged to permit a transversely disposed pair of the wheels to tilt with the tilting frame, but not the body, as the tilting frame tilts.

20. The vehicle of claim 19, wherein the suspension assembly includes one of a planar four bar linkage mechanism and a displacement mechanism.

* * * * *